United States Patent [19]

Maxcy et al.

[11] 4,273,796
[45] Jun. 16, 1981

[54] PREPARATION OF DEHYDRATED SUGAR TREATED BEANS

[75] Inventors: Thomas A. Maxcy, Lincoln, Nebr.; John S. Denny, Minneapolis, Minn.

[73] Assignee: General Mills, Inc., Minneapolis, Minn.

[21] Appl. No.: 113,833

[22] Filed: Jan. 21, 1980

[51] Int. Cl.$^3$ .............................................. A23L 1/20
[52] U.S. Cl. ................................. 426/634; 426/331
[58] Field of Search ............... 426/629, 634, 640, 460, 426/508, 309, 331

[56] References Cited

U.S. PATENT DOCUMENTS

| | | | |
|---|---|---|---|
| 2,019,141 | 10/1935 | Knowles | 426/407 |
| 2,360,062 | 10/1944 | Lannen | 426/634 |
| 3,203,808 | 8/1965 | Thompson et al. | 426/460 |
| 3,290,159 | 12/1966 | Dorsey et al. | 426/460 |
| 3,340,068 | 9/1967 | Mancuso | 426/634 |
| 3,388,998 | 6/1968 | Ozai-Durrani | 426/460 |
| 3,510,313 | 5/1970 | Steinkraus et al. | 426/634 |

OTHER PUBLICATIONS

Feldberg, Fritzsche & Wagner, *Food Technology*, 'Preparation and Evaluation of Precooked Dehydrated Bean Products,' Nov. 1956.

Dorsey, et al., *Food Technology*, 'New Continuous Production Facility for Processing Instant Precooked Beans,' vol. 15, No. 9, 1961.

*Primary Examiner*—Joseph M. Golian
*Assistant Examiner*—Elizabeth J. Curtin
*Attorney, Agent, or Firm*—John A. O'Toole; Gene O. Enockson

[57] ABSTRACT

The present invention relates to a method for preparing precooked, dehydrated legumes which exhibit both minimal splitting or butterflying upon post cooking dehydration and minimal hardspotting upon rehydration in warm water. The method comprises (A) cooking legumes in sugar solutions essentially ranging from about 5 to 7 Brix and at between about 180° F. to 350° F. until the legumes are tender and fully hydrated. Thereafter, the cooked legumes are (B) dehydrated to shelf stable moisture contents of between about 4% to 12% using conventional dehydration techniques.

8 Claims, No Drawings

PREPARATION OF DEHYDRATED SUGAR TREATED BEANS

BACKGROUND OF THE INVENTION

1. Field of the Invention

The present invention relates to food products and to their methods of preparation. More particularly, the present invention relates to dehydrated, precooked beans and to their methods of preparation.

2. The Prior Art

To prepare raw beans for consumption typically requires extended cooking times. Additionally, when dried raw beans are employed, extended soaking times, e.g., up to 16 hours using ambient temperature soaking water, are required before cooking (see, for example, U.S. Pat. No. 2,360,062 issued Oct. 10, 1944 to H. T. Lannen). Such cooking and/ or precook soaking steps in traditional bean preparation methods are thus time consuming and onerous.

Art attempts at providing food products which do not require such extended and difficult preparation have taken two tacks: (1) provision of precooked, hydrated, canned beans, and (2) precooked, dehydrated beans. An exemplary method for preparing cooked, hydrated canned beans is found in U.S. Pat. No. 2,019,141 (issued Oct. 29, 1935 to J. T. Knowles). While precooked, hydrated canned beans do not require extensive preparation, canned beans suffer shipping weight and storage disadvantages vis-a-vis dehydrated beans.

Numerous attempts have been made in the art at providing dehydrated beans which are capable of quick rehydration. Such dehydrated bean products nonetheless suffer from certain disadvantages. First, such dehydrated beans suffer from the "splitting" of the beans during dehydration. As described by Feldberg, Fritzsche, and Wagner in "Preparation and Evaluation of Precooked Dehydrated Bean Products", Food Technology, Nov. 1956, precooked beans normally split wide open upon exposure to a dehydrating environment. This splitting apparently is caused by differential rate of drying between the bean skin and cotyledon. As used herein, the term "splitting" is used to refer to any partial separation of the bean halves. More severe cases of splitting are referred to in the art and herein as "butterflying". In butterflying, the beans are so severely split that the two bean halves are on the same plane rather than facing each other. The visually unattractive butterflying of the beans upon dehydration is, however, reversed upon hydration.

One method for reducing the butterflying in the dehydrated bean is to freeze the beans prior to dehydration as described in "New Continuous Production Facility for Processing 'Instant' Precooked Beans", Food Technology (1961), Vol. XV, No. 9, pg. 13-18. However, the blast freezing equipment there described is relatively expensive and the freezing step can adversely affect final product attributes.

Another method for reducing the butterflying is disclosed in U.S. Pat. No. 3,290,159 (issued Dec. 6, 1966 to W. R. Dorsey et al.) The 3,290,159 patent discloses a method of bean preparation involving a two step dehydration process. In the 3,290,159 method the precooked beans are slowly reduced in their moisture content to below 40% by weight and thereafter rapidly dried to their final content. Another controlled dehydration method is disclosed in U.S. Pat. No. 3,340,068 (issued Sept. 5, 1967 to J. J. Mancuso). The 3,340,068 patent teaches a method wherein cooked legumes are washed with certain water soluble organic hydrophilic agents thereby dehydrating the legumes, removing the extracted water and then finish drying the legumes.

Other methods for producing precooked dry beans without butterflying by sugar treating cooked beans are known such as the method disclosed in U.S. Pat. No. 3,510,313 (issued May 5, 1972 to K. H. Steinkraus et al.) This patent teaches a method for preparing precooked dry beans by hydrating the dry beans, precooking the hydrated beans in steam, immersing them in a 20° Brix solution (i.e., 20% by weight sugar) for 5 minutes, and then dehydrating them to realize the dry beans. Similarly, another known method involves presoaking and-/or cooking in 20% and above sugar solutions to yield beans resistant to butterflying during subsequent drying.

Another problem associated with dehydrated precooked beans is "hardspotting". "Hardspotting" generally refers to small bean regions which rehydrate comparatively slower than the remainder of the bean. Consumption of beans having unrehydrated bean regions is organoleptically undesirable. Unfortunately, it appears that even those prior art precooked dehydrated bean products which are resistant to butterflying upon dehydration nonetheless exhibit hardspotting upon subsequent rehydration. To overcome hardspotting and to assure complete rehydration, present dehydrated beans must be rehydrated in substantial excess of water at elevated temperatures for upwards of at least 15 minutes in order to insure complete rehydration.

Given the state of the art as described above, there is thus a continuing need for new and useful precooked, dehydrated bean products which are not subject to butterflying and hardspotting. Accordingly, it is an object of the present invention to provide visually attractive, precooked and dehydrated bean products capable of rehydration in water in less than 10 minutes.

It is a further object of the present invention to provide methods for the preparation of such precooked, dehydrated bean products.

It is a further object of the present invention to provide precooked, dehydrated bean products adapted to rapidly rehydrate in water without boiling.

It has been surprisingly discovered that the objectives can be realized and superior food products provided by A) cooking beans in low concentration sugar solutions until cooked and hydrated and, thereafter, B) dehydrating the beans to provide the present precooked dehydrated bean products.

SUMMARY OF THE INVENTION

The present invention relates to methods for preparing precooked, dehydrated beans which are capable of rapid rehydration in warm water. The present methods enable the provision of dry beans which minimizes undesirable "butterflying" of the bean cotyledon upon dehydration of the cooked bean and which also minimizes "hardspotting" upon rehydration of the dehydrated bean.

The present methods of bean preparation comprise a first cooking step wherein beans are cooked in an aqueous sugar solution until moisture contents essentially ranging between about 62% to 70% are reached. The sugar concentration essentially ranges from about 5% to 7%. The cooking step is conducted at a sugar solution temperature ranging between about 180° F. to 350° F.

After cooking, the beans are dehydrated in any manner to a final moisture content essentially ranging between about 4% to 12%.

DETAILED DESCRIPTION OF THE INVENTION

The present invention relates to precooked dehydrated bean products which are adapted to rapid rehydration in warm water. In its method aspect, the present invention resides in a method for preparing the present bean products essentially comprising A) cooking the beans in a low concentration sugar(s) solution until fully hydrated and thereafter B) dehydrating the beans. Each of the product preparation steps as well as product use are described in detail below.

Throughout the specification and claims, percentages are by weight and temperatures in degrees Fahrenheit, unless otherwise indicated.

A. Cooking the Beans

The method of the present invention is applicable to legumes in general and is particularly useful for beans, e.g., lima, navy, pinto, red kidney, dark red kidney, and red beans whether dry or freshly harvested (i.e., up to 50% moisture content). The present method provides "instant" dehydrated precooked beans. By the term "instant" it is meant herein that the present beans are capable of rehydration in warm water (e.g., less than 160° F.) in less than 10 minutes with minimal hardspotting.

It has been surprisingly discovered that cooking of beans in sugar solutions essentially ranging from about 5% to 7% can provide beans which exhibit both minimal butterflying upon subsequent dehydration and minimal hardspotting upon rehydration. Thus, the practice of the present method enables the realization of visually attractive dehydrated precooked bean products which "instantly" rehydrate upon addition to warm water. Although less rapidly, the present instant dry beans even rehydrate in room temperature water.

The beans are cooked at from between about 180° F. to 350° F. The term "cooking" as used herein in its conventional usage in the food art to effect hydration and tenderization of beans by application of moisture and heat. Thus, the practice of the cooking step includes, for example, open boiling or pressurized heating, i.e., retorting. It is, of course, not required that the sugar solution be boiling, per se, at whatever pressure, to successfully practice the invention. However, simple immersion into sugar solutions for relatively short periods of time is not sufficient to realize the present instant bean products.

Dry beans such as pinto beans have a moisture content of about 10-12% moisture. Upon open boil cooking in plain water for about 1.5 to 1.75 hours, the beans are fully cooked and hydrated. Further cooking e.g., beyond 2 hours, results in beans of so weak a structure that upon rehydration disintegration of the bean occurs, causing an undesirable loss of product identity. Surprisingly, cooking in the low concentration sugar solution allows the beans to be cooked for longer periods e.g., exceeding 3 hours with open boiling without such disintegration upon rehydration. While not wishing to be bound to the proposed theory, it is speculated that the extended cooking in such sugar solution accounts for the surprisingly more rapid rehydration exhibited by the present instant dry beans.

When beans are cooked in sugar solutions exceeding the about 5% to 7% sugar concentration range of the present invention, the resultant cooked beans upon dehydration exhibit decreased butterflying although also undesirably exhibit hardspotting. While the exact mechanism is unknown, it is believed that excess sugar absorption i.e., greater than about 14% dry weight basis, interferes with water imbibition rates upon subsequent rehydration. Accordingly, it is important to maintain the initial sugar concentration within the essential 5% to 7% range throughout the cooking step. Thus, for example, when open boiling is the cooking technique employed, water addition would be needed periodically to prevent the sugar concentration from rising above 7% due to water loss through absorption by the bean and evaporation.

The present cooking step is continued until the beans essentially contain from about 62% to 70% moisture, preferably between about 63% to 67% and most preferably about 65%. Cooked to beyond 70% moisture, beans begin to disintegrate upon rehydration even when cooked in the present low concentration sugar solutions. When open boiling is the cooking technique employed for dry pinto beans (10% initial moisture), for example, the beans can be cooked and hydrated to a moisture content ranging between about 62% to 70%. Of course, when higher moisture content beans are employed such as fresh lima beans (apx. 50% moisture) then shorter cooking times can be used.

While sucrose is the most preferred sugar for use herein, it will be appreciated that other sugars can be used in whole or in part as replacement for sucrose. Suitable sugars include, for example, both mono and dissacharides such as dextrose, maltose, fructose, corn syrup or corn syrup solids, honey, molasses, and the like. Preferred sugars for use herein are selected from the group consisting of sucrose, dextrose, fructose, and mixtures thereof.

From the foregoing description of the present cooking step, it is to be appreciated that certain art recognized essential or preferred steps can be eliminated in the present method of instant dry bean preparation. Such steps include, for example, extended soaking of the beans, blanching of the beans, and post-cook quenching of the beans. Rather, after cooking the beans in accordance with the present methods, the cooked beans can be directly dehydrated.

B. Dehydrating the Cooked Beans

After cooking, the beans can then be dehydrated to a final moisture content essentially ranging from about 4% to 12%, and preferably between about 4% to 8%. Maintenance of the beans' final moisture content within the above range is important to ensuring the storage stability of the dehydrated cooked product of the present invention. Maintenance of the final moisture content within the above range is also important to providing dehydrated bean products capable of rapid rehydration in water without boiling. For best results, the beans' final moisture content should be about 6%.

Unlike certain prior art methods for the preparation of dehydrated precooked beans, the methods herein for preparing the present instant beans do not require elaborate dehydration techniques. Any conventional dehydration technique can be employed to practice the present dehydration step. Such techniques include, for example, freeze drying, vacuum drying, hot air convection drying whether static or forced air, and radiant or microwave heat drying. Combinations of the above dehydration techniques can also be used such as vacuum, forced hot air drying or microwave assisted hot air drying. Also contemplated herein is partial dehydration accomplished by employing one technique while all or part of the remaining dehydration is accomplished by employing other dehydration techniques. While not necessary for the realization of the present bean products, resort to complex dehydration schemes may be influenced by economic or process control considerations. If desired, the drying can be conducted in stages, that is, a portion of the moisture content is removed in one stage, the material allowed to stand to permit equilibrium of moisture, and further drying and equilibrium are repeated as necessary to achieve a final moisture content within the above-given essential range.

In a preferred embodiment of the present methods of instant bean preparation, the dehydration step is practiced using conventional forced hot air tray or bed drying. For example, a tray dryer can be used where the bean, spread on trays, e.g., up to 2 inches in bed depth, are exposed to a cross flow or through flow of air at about 100° F. to 200° F., preferably between about 125° F. to 170° F. and, for best results, between about 125° F. to 135° F.

The dehydration times required will depend upon several parameters including bed depth, relative humidity of the hot air, air temperature and circulation rate, the final moisture content of the finished product and the size of the bean product. Generally, faster dehydration rates are achieved with decreased bed depths, relative humidity and bean size and with increased air temperature and circulation rates and final moisture contents.

Composition Use

Instant beans prepared according to the present invention can be used to prepare quick bean dishes by simply adding the beans to standing warm water (e.g. 130° F. to 160° F.) and rehydrating for from 4 to 10 minutes. Slightly longer rehydration times are needed with room temperature rehydration water. If desired, the present instant dry beans can be blended with dry sauce ingredients, e.g., dry chili sauce, and have measured amounts of water rehydrate both at the same time. In such instances, rehydration rates of the beans are slightly retarded by virtue of the dry sauce ingredients.

The following examples illustrate certain preferred embodiments of the invention and are not intended as limiting the invention.

EXAMPLE I

Precooked, dehydrated beans capable of rapid rehydration of the present invention are prepared as follows:

2500 g. of dry (i.e., apx. 12% moisture) pinto beans, (Phaseolus vulgaris) are added to a pot holding seven liters of water and 500 g. of sucrose, i.e., apx. 7.1 Brix sugar solution. The pinto beans are then cooked in this sugar solution with open boiling (apx. 210° F.) for apx. 2¼ hours after which the beans are about 65% moisture. The cooked, hydrated beans are whole and intact.

Thereafter, the beans are dehydrated. The beans are spread on trays to bed depths of apx. 2 inches and dried in tray driers with a down flow of hot air (apx. 180° F.; 5% Rel. Hum.) for 60 minutes. A sampling for moisture indicates the beans have between about 25-30% moisture.

The beans are then further dried with 130° F. air. The dehydrating is continued until intermittent moisture sampling indicates a moisture of 6%. Total additional dehydrating time with 130° F. air is about 45 minutes. The beans so prepared are characterized by both reduced butterflying and splitting and by reduced hardspotting upon rehydration.

Both butterflying and splitting of the dehydrated beans are observable by visual examination. Hardspotting is tested by pouring about 250 g. boiling water into a styrofoam cup holding apx. 50 g. of the dehydrated beans, allowing the beans to rehydrate 4 min. in the apx. 160°-170° F. water, and then draining the beans. The rehydrated beans are then squeezed between fingers to determine whether hardspotting has occurred.

Pinto beans were prepared by the above method in various sugar solutions and were examined for both butterflying and hardspotting. The results of such testing are given in Table I below:

TABLE I

| Wt. % Sugar in Cooking Solution | Sucrose Butterflying | Hardspotting upon Rehydration |
| --- | --- | --- |
| 1.0% | Much butterflying (>70%) | apx. 7% mushy texture for all beans |
| 3.5% | Some butterflying (5%) | apx. 16% good texture |
| 7.0% | No butterflying | apx. 23% |
| 10.0% | No butterflying | apx. 100% |

As can be seen from the above Table I, beans cooked in solutions with insufficient sugar result in dehydrated beans exhibiting high incidence of butterflying. Almost all the beans exhibit at least some splitting. In contrast, beans prepared according to the present method of dehydrated bean preparation exhibit greatly reduced incidence of butterflying.

As can also be seen from the above Table I, bean cooking in solutions with excessively high sugar levels results in beans exhibiting high incidence of hardspotting. In contrast, dehydrated beans prepared by the present methods exhibit reduced incidence of hardspotting. Thus, it can be seen that only the present method of dehydrated bean preparation can provide beans which desirably exhibit both minimal butterflying or splitting and minimal hardspotting.

EXAMPLE II

Red beans (5000 g.) are added together with 14 liters water and 1.1 kg. sucrose. The beans are then retort cooked at 20 psig. for 30 minutes until cooked (64% moisture) and tender. After rinsing, the beans are vacuum dehydrated at 150° F. (700 Torr.) to a final moisture content of about 10%. The precooked dehydrated beans of the present invention so prepared exhibit minimal hardspotting and butterflying.

EXAMPLE III 5000 of pinto beans are added to 14 liters of water and 0.9 kg. (6.5 Brix) dextrose and boiled at atmospheric pressure for 1.5 hours. The cooked, tender beans are apx. 68% moisture. The pinto beans are then rinsed and then air dried in a gas fired batch tray dryer (1½ inch bed depth) at 130° F. (5% Rel. Hum.) and moderate air downflow (apx. 100 ft. 3/min.) to a final moisture content of about 8%. This method also provides precooked, dehydrated pinto beans capable of rapid rehydration in warm water.

What is claimed is:

1. A method of preparing precooked dried leguminous beans, consisting essentially of the steps of:
   A. cooking leguminous beans in an aqueous solution of from about 5% to 7% by weight sugar from about 30 minutes to 3 hours until the leguminous beans are from about 62% to 70% by weight water at from about 180° F. to 350° F.; and, thereafter;
   B. dehydrating leguminous beans to form dried legumes having a moisture content of from about 4% to 12% by weight.

2. The method of claim 1 wherein the sugar is selected from the group consisting of sucrose, dextrose, fructose, and mixtures thereof.

3. The method of claim 2 wherein the dehydration step is practiced using forced hot air drying.

4. The method of claim 3 wherein the leguminous beans are dehydrated to form dried leguminous beans having a moisture content of about 4% to 8% by weight.

5. The method of claim 4 wherein the sugar is sucrose.

6. The method of claim 4 wherein the beans are selected from the group consisting of pinto beans, red beans, lima beans, navy beans, red kidney and dark red kidney beans.

7. The method of claim 6 wherein the beans are cooked by open boiling.

8. The method of claim 6 wherein the beans are cooked by retorting.

* * * * *